United States Patent [19]

Zawada et al.

[11] Patent Number: 6,083,318
[45] Date of Patent: Jul. 4, 2000

[54] LIGHTWEIGHT, WATERPROOF, INSULATING, CEMENTITIOUS COMPOSITIONS AND METHODS FOR FORMING AND USING SUCH COMPOSITIONS

[76] Inventors: Joseph M. Zawada; Sandra K. Zawada, both of P.O. Box 616, Ashland, Mont. 59003

[21] Appl. No.: 09/217,251

[22] Filed: Dec. 21, 1998

Related U.S. Application Data

[63] Continuation-in-part of application No. 08/367,878, Jan. 3, 1995, Pat. No. 5,782,970.
[60] Provisional application No. 60/003,622, Sep. 12, 1995.

[51] Int. Cl.[7] .................................................. C04B 07/06
[52] U.S. Cl. ..................... 106/718; 106/811; 106/DIG. 4
[58] Field of Search ............................... 106/713, DIG. 4, 106/718, 811

[56] References Cited

U.S. PATENT DOCUMENTS

| | | | |
|---|---|---|---|
| 4,303,450 | 12/1981 | Hacker . | |
| 4,684,407 | 8/1987 | Umezawa et al. | 106/809 |
| 4,935,034 | 6/1990 | Alexander | 52/415 |
| 5,294,255 | 3/1994 | Smetana et al. | 106/698 |
| 5,588,990 | 12/1996 | Dongell | 106/819 |
| 5,591,259 | 1/1997 | Huang et al. | 106/696 |
| 5,637,144 | 6/1997 | Whatcott et al. | 106/DIG. 4 |
| 5,650,004 | 7/1997 | Yon | 106/719 |
| 5,852,077 | 12/1998 | Zawada et al. | 524/8 |

*Primary Examiner*—Paul Marcantoni
*Attorney, Agent, or Firm*—Nixon Peabody LLP; Daniel W. Sixbey

[57] ABSTRACT

A lightweight, cementitious composition and method which includes a noncementitious filler, Portland cement, bentonite, diataomaceous earth and lime. The noncementitious filler may be sawdust, rubber chips, flyash or combinations of two or more of these ingredients. Once mixed with water and air, the composition can be molded to form a variety of structures, including electrically nonconductive posts, and can be used to absorb and contain liquid contaminants in a vessel.

9 Claims, No Drawings

LIGHTWEIGHT, WATERPROOF, INSULATING, CEMENTITIOUS COMPOSITIONS AND METHODS FOR FORMING AND USING SUCH COMPOSITIONS

This application is a continuation in part application of U.S. Ser. No. 08/367,878 filed Jan. 3, 1995 now U.S. Pat. No. 5,782,970 and U.S. Provisional Application No. 60/003,622 filed Sep. 12, 1995.

TECHNICAL FIELD

The present invention relates to improvements in concrete products, and methods for forming and using the same and specifically to a structural insulating lightweight concrete that is waterproof and which is used for floors walls, structural panels, pallets, electrically nonconductive poles, and, when used in slurry form is particularly useful in environmental cleanup.

BACKGROUND OF THE INVENTION

Conventional concrete is a mixture of cement, sand, aggregate, and water. The addition of materials to cement to lower the weight of the concrete, to increase insulating qualities, and to impart other desirable properties is well known in the art. Adding sawdust or other low-density materials to reduce the weight of the composition and to improve insulating properties is illustrated in U.S. Pat. No. 889,569 to Albrecht (1908), U.S. Pat. No. 1,039,038 to Light (1919), U.S. Pat. No. 1,463,123 to McAllister (1922), U.S. Pat. No. 1,384,370 to Bartlett (1924), U.S. Pat. No. 2,057,330 to Eichert (1936), U.S. Pat. No. 2,592,345 to Schnell and Bosshard (1947), U.S. Pat. No. 2,899,325 to Kranz et al. (1952), U.S. Pat. No. 3,264,125 to Bourlin (1966), U.S. Pat. No. 4,166,455 to Araujo and Tick (1977) and U.S. Pat. No. 5,207,830 to Cowan et al. (1993). In addition to sawdust, other organic low-density materials such as hemp, wood shavings, bark particles, sugar cane, cotton waste, and pulp-mill waste have been used.

Chlorides, silicates, nitrates, and sulfates have been added to Portland cement to increase the binding of the particles in the concrete. Various additives are shown in U.S. Pat. No. 1,309,296 to Marks (1919), U.S. Pat. No. 1,463,123 to McAllister (1922), U.S. Pat. No. 1,484,370 to Bartlett (1924), U.S. Pat. No. 2,057,330 to Eichert (1936), U.S. Pat. No. 2,592,345 to Schnell and Bosshard (1947), U.S. Pat. No. 3,264,123 to Coming and McNally (1962), U.S. Pat. No. 3,311,483 to Garnier et al. (1967), and U.S. Pat. No. 5,122,405 to Sanchez (1992).

It is often desirable to utilize cements and concretes which are lightweight, strong, durable and affordable. It is known that many of the techniques for making lightweight organic materials require the process of using hammer mills, presses, heat, extended curing time, bringing the slurry to boiling point, and slaking the material in vats for days. U.S. Pat. No. 5,112,405 to Sanchez (1992), discloses the use of ammonium sterate to produce gaseous bubbles by reacting a calcium chloride. His claim was that the bubbles by reacting to calcium chloride produced a lighter, better-insulated board. What is needed is a less expensive and more efficient way of creating the bubbles.

Lightweight cement designs usually have higher than normal water demands, resulting in slow setup times, and weak, highly porous cement. When sawdust, rubber crumbs, and similar lightweight fillers have been used in the mix, the cement tends to encapsulate rather than bond to the filler. What is needed is a tighter pore system that would not allow the aggression of the elements to penetrate, would have high insulating qualities, and would bond to the fillers used.

Another aspect of using lightweight cements other than for building purposes is well known. Lightweight cement is also used in the containment of liquid contaminants. In dealing with underground cylinders and tanks, what is needed is a material with the capacity to absorb the contaminants and further to encapsulate said contaminants to reduce the possibility of leaching of the contaminants. If the contaminants are not totally contained, there are possibilities that the dangerous liquids could leach into the surrounding water table and pollute drinking water and surrounding soil.

Mechanical and electrical vibrators are often required in the process of filling cylinders and tanks. Due to the unpredictable nature of many contaminants, mechanical and electrical vibrators prove to be dangerous. It is desirable to have a material that does not require the use of mechanical and electrical vibrators or other devices that could prompt an explosion. Materials that are easy to pour, easy to clean up and affordable to use are desirable and needed for these purposes.

In the past, bentonite has been used as a primary component in a grouting composition for sealing a borehole, U.S. Pat. Nos. 4,964,918 and 5,021,094 to Brown et al. (1990 and 1991), as a cementitious mud for constructing a water impermeable wall in the ground, U.S. Pat. No. 3,759,044 to Caron et al. (1973) as a high solid slurry, U.S. Pat. No. 5,266,538 to Knudson et al. (1993) and as an additive for concrete block, U.S. Pat. Nos. 4,568,390 and 4,673,437 to Gelbman (1986 and 1987) and U.S. Pat. No. 4,861,378 to Watanabe et al. (1989). Although the ability of bentonite to reject water is well known, it has not been used to insure the bonding of a cementitious mixture to a noncementitious filler.

DISCLOSURE OF THE INVENTION

It is a primary object of the present invention to provide a lightweight cementitious composition containing a noncementitious filler material which is integrally bonded within the composition so that the composition, when cured provides a structure which can be cut or drilled with standard carpentry tools without crumbling or the separation of the filler material.

Another object of the present invention is to provide a lightweight cementitious composition and method for forming the same which is fire resistant, insect resistant and waterproof.

A further object of the present invention is to provide a lightweight cementitious composition and method for forming the same which incorporates fillers such as rubber, wood chips, sawdust, flyash or combinations thereof and incorporates bentonite in controlled amounts to control porosity, and reject water in products formed from the composition while enhancing the bond with the filler materials.

Yet another object of the present invention is to provide a lightweight cementitious composition and method for forming the same which incorporates rubber in crumb or chunk form as the sole filler with cement, diataomaceous earth, bentonite, lime and water.

A further object of the present invention is to provide a lightweight cementitious composition and method for use in forming pallets. The composition can be incorporated under pressure in PVC tubes which are then fastened together in pallet form.

Another object of the present invention is to provide a method for employing a bentonite containing cementitious material with a sawdust filler for containing contaminated liquids.

Yet another object of the present invention is to provide a building material that is well suited in the application of poured floors and has insulation qualities 30 to 40 times the resistance of standard concrete (resistance to thermal change). The material incorporates a sawdust filler with bentonite and air entrapment to produce a floor that is user friendly in applying. The new composition is hard wearing and well insulated against heat, cold or the intrusion of dampness as well as providing a more yielding, softer surface.

A still further object of the present invention is to provide a lightweight cementitious composition and method for use in the formation of fence posts and telephone poles which are lightweight, resilient and are not electrically conductive.

DETAILED DESCRIPTION OF THE PREFERRED EMBODIMENTS

A cementitious composition is formed in accordance with this invention which yields a strong, lightweight, waterproof, insulating concrete when cured. The composition in a broad embodiment, includes the following parts by volume: 1 to 6 parts of sawdust, 1 to 3 parts of bentonite, 1 to 3 parts of diataomaceous earth (diatomite), 1 to 2 parts of calcium oxide, ½ to 1 parts of sodium chloride, 1 to 3 parts of Portland type I or II cement, $1/16$ to ½ parts of fibermesh, 1 to 5 parts of water between 48° to 80°, and 10 to 16 ounces per 100 pounds of cement of Rheobuild 1000 or other additives and plasticizers. Some of the sawdust may be replaced with 1 to 2 parts flyash, preferably pozzolan.

In smaller, specific amounts, the composition may include 6 parts of sawdust, 1 part of bentonite, 1 part of diatomite, ½ part of calcium oxide, ½ part of sodium chloride, 1 part of Portland cement and 3 parts of water or multiples of these amounts which fall within the ranges given above.

The sawdust need not be excessively dry. Sawdust, in its natural form is very absorbent and is used without heating. Pine, larch and various types of sawdust have been used, and panels containing sawdust and/or wood chips, in accordance with the present invention, have good compressive and structural strength. Panels so constructed also have excellent thermal and acoustical insulating qualities.

To achieve a high degree of impermeability, bentonite has been used as an important component of the composition. Although bentonite is well known as a water swellable, colloidal clay, it has not been previously employed in cementitious compositions containing diataomaceous earth, such as diatomite, and fillers such as sawdust, wood chips, rubber, flyash or combinations thereof. Bentonite swells when exposed to water and invades cracks and irregularities in the filler materials to enhance bonding therewith. Bonding is further enhanced by the slaking effect provided by calcium oxide and sodium chloride in the mix which offset the catalytic effect of diataomaceous earth which tends to cause a cementitious composition to encapsulate rather than bond to a filler material. This bond is important if the cementitious composition including the filler is to resist crumbling when subjected to impacts or when cut or drilled. Furthermore, when the cementitious composition is in slurry form, the introduction of air to the slurry would normally tend to separate the noncementitious filler material from the Portland cement creating a weakened structure when the composition sets, but the bond created by the bentonite allows air to be introduced and a structure having enhanced strength to result. Also, bentonite, in controlled amounts, imparts a consistency to the composition which is difficult to achieve with clays which might differ in composition depending upon the locale of origin.

Considering with particularity additional attributes imparted by components of the cementitious composition of the present invention, diatomite, when added to Portland cement, offers a remarkable improvement in plasticity and general workability. The Pierce Testing Laboratories of Denver, Colo., found that a 3% addition of diatomite (based on cement weight) increased compressive strengths at 28 days by 29% while increasing impermeability by as much as 220%. When diatomite is used, the cement has a smoother, uniform texture and better pumpability.

Calcium oxide contributes to the plasticity of the mix. It is also useful in creating a very tenacious adhering power which helps the mix hold to forms and molds. It also helps adhere to walls in a stucco application.

Sodium chloride helps the slaking effect of the calcium oxide and improves the mixability of the components. Sodium chloride also hastens the set-up time and increases the absorption level of the mix.

A good quality type I/II Portland cement can be used. Either the grey or the white cement can be utilized.

Products produced with the invention can be made with various dyes and pigments if a colored product is desired. The product can be either painted or treated with polyurethane.

Water should be clean, and, for best results, be used between a 50 to 80 degree temperature range.

By creating "bubbles" in the cement using an air compressor, the density is lowered and the entrapped air bubbles cause the mixture to have a greater insulation value. Adding the air bubbles allows the homogenous blending of all of the ingredients, but this beneficial result requires the use of the cementitious compositions formed with bentonite in accordance with the present invention. Normally, the injection of air into a cementitious composition weakens the strength of structure formed therefrom, but the combination of bentonite and air in the cementitious composition of the present invention imparts unique properties which result in an increase in both strength and fluidity.

The dry ingredients are put in a mixer, preferably in the order listed above. The ingredients are allowed to rotate and mix in the mixing device, and when the water is added, the timing is started and the mix is rotated for four minutes. After the four minutes, the mixer drum is stopped from rotating and the air bubbles are introduced to the mass. Air pressure of 40 to 60 pounds has been then induced into the mass by way of the air hose connected to an air compressor. The mixture is then pumped or poured into the panels or forms whichever is being used, and the air bubbles are then introduced into the cementitious material in the form by air under pressure. By using air bubbles, the mix takes the exact shape of the form and eliminates the honeycomb effect which would occur without the air bubbles. Even in pouring a floor or slab, the air bubbles are kept in the mix. This allows the homogenous blending of all the ingredients.

It is imperative that sufficient water be added to the mix to provide a suitable texture for pumping or pouring into forms or molds. Unlike prior art compositions, no pressure is required on the material in the mold. Also, vibration is not needed as the air bubbles replace the need for vibratory plates. The forms or molds can be released after the composition sets, and the finished panels can be allowed to cure. It takes 30 days for the mixture to cure to full strength under normal conditions. In the use of the material in prepoured walls, the forms can be removed after 36 hours under normal conditions. In the use of the material in pouring floors, the material should also be allowed 36 hours to set up properly.

While the above embodiments of this invention have been described, it is understood that the invention is capable of other functions. Also, it should be understood that the lightweight, insulating, waterproof, cement, and concrete terminology described herein is intended to be generic and should not be regarded as limiting.

The new composition described herein provides the following benefits: 1) a lightweight cementitious composition approximately one third to one half the weight of standard concrete; 2) entrapped air gives the composition an insulating property approximately 30 to 40 times more thermal resistant than standard concrete; 3) the end product is capable of being worked with standard carpentry tools; 4) is fire resistant; 5) resistant to insects; 6) is easy to clean; 7) and the slurry formed when water is added can be readily agitated by compressed air to help vibrate and homogenize the mass.

The first embodiment of the present invention particularly relates to novel compositions for the preparation of concrete building materials and to building panels prepared from such compositions. It has been found that the addition of the sodium chloride, calcium oxide and the use of bentonite with 40 to 60 pounds of compressed air in the mixing process, produces a building material with superior properties. The material sets up rapidly and has vastly improved thermal and acoustical insulating qualities as well as 30 to 40 times the insulating properties of standard concrete. The material is one third the weight of regular concrete and is fire resistant, easy to clean, and is resistant to insects and mold.

In experiments conducted where a portion of the sawdust of the first embodiment was replaced by flyash, excellent cementitious compositions were formed using the following parts by volume ranges:

4 parts sawdust
2 parts flyash
1 part bentonite
1 part diataomaceous earth
1 part Portland cement
¼–1 part calcium oxide
¼–1 part sodium chloride
3–6 parts water This composition was mixed and air was introduced as previously described.

Several types of flyash are available which can be used in the cementitious composition of the present invention with varying degrees of effectiveness. A large source of flyash results from the burning of coal in electrical generating facilities, and this flyash may be effectively used for many applications. Also naturally occurring volcanic flyash (pozzolan) is available for use, and when volcanic flyash in a highly purified form is used, the strength of a product formed from the cementitious composition is significantly enhanced. A high grade of pozzolan which has been found to be very advantageous for use in the cementitious composition of the present invention is pozzolan having a very high alumina content within a range of from 17–19% alumina. Class N pozzolan (ASTMC-618-89, Standard Specification for Flyash and Raw or Calcined Natural Pozzolan for use as a Mineral Admixture in Portland Cement Concrete) having this alumina content is used to provide a cementitious composition of enhanced strength.

In another embodiment of the invention, some of the sawdust is replaced with cinders or sand instead of the flyash listed above. This is to increase the hardness and wearability of the material, and is particularly helpful when the material is to be used for roofing or for exterior stucco.

The invention further includes a third embodiment which involves replacing a portion or all of the sawdust with rubber chips, either chips that are called buffings or first time chips from the primary shredder. The composition can include parts by volume formulations including up to 3 to 5 parts of rubber (buffings or chips), 2 to 5 parts of sawdust, 1 to 4 parts of bentonite, 1 to 3 parts of diataomaceous earth (diatomite), ½ to 2 parts of calcium oxide, ¼ to 1 part of sodium chloride, 1 to 3 parts of pozzolan flyash, 1 to 3 parts of Portland type I or II cement, ¹⁄₁₆ to ½ parts fibermesh, 1 to 5 parts of clean water, and 10 to 16 ounces per 100 pounds of cement of Rheobuild 1000 or other additives and plasticizers.

Successful experiments have been conducted using the following formulations:

1–3 parts rubber
2¼–4 parts sawdust
0 to 1 part flyash
1 part bentonite
1 part diataomaceous earth
½–1 part lime (calcium oxide)
½ part potassium chloride
1 part Portland cement
3 parts water The action of bentonite to cause the cementitious composition to invade the cracks and irregularities in the filler material rather than to merely encapsulate the filler material has led to the successful development of rubber as the sole filler material without sawdust or flyash in a fourth embodiment of the invention. It has been found that chunks of rubber of up to one inch to two inches in cross sectional size may be effectively employed. When these rubber chunks are cut from old tires, the tire reinforcing material may be left in the chunks to further reinforce structures formed from the resultant cementitious composition. Successful experiments have been conducted using the following formulation and one to two inch rubber chunks:

5 parts rubber
2 parts Portland cement
1 part diataomaceous earth
1 part bentonite
½ part lime
1–3 parts water Since rubber does not absorb water, less water can be used than is used when sawdust and flyash constitute fillers for the composition.

Structures formed from the cementitious composition where rubber, either alone or in combination with sawdust and possibly flyash, is used as a filler are lightweight, do not conduct electricity, and have more resilience and bendability than structures formed from conventional cementitious compositions. These structures are also more buoyant making them ideal for marine uses. However, they are particularly adopted for use as fence posts, telephone poles and electrical powerline poles, for in addition to the attributes listed above, they are resistant to water, insects and fire. Such posts and poles are easily formed using any of the rubber containing formulations listed. The dry materials are thoroughly mixed in a rotary or other suitable mixer, water is subsequently added and the hydrated mixture is again thoroughly mixed. Then air bubbles are added using air under pressure and the aerated cementitious composition is extruded into a mold. For both fence posts and telephone and electrical poles, PVC pipes of a desired diameter and length have been found to form a simple, effective and inexpensive mold from which the post or pole once set, can be easily removed. For some applications, the cured cementitious material can be left in the PVC pipe which forms an outer coating on the resultant structure. Structures formed in this manner, with or without the PVC pipe, can be cut and drilled with conventional carpenter's tools and will receive nails and screws.

All of the cementitious compositions described may be effectively used in producing a wood-substitute industrial pallet. The dry ingredients are again mixed in a rotary mixer before the water is added. With the addition of water, the mixing time varies from 2 to 10 minutes. The temperature range of the water can vary from 48° to 80°, but the higher temperatures decrease the setting time. The mixed ingredients are then aerated as described and pumped or poured into molds that are capable of either producing components of a wood-substitute pallet or an entire one-piece wood-substitute pallet. In the mold, it is desirable to subject the composition to pressure by a ram type mold component to force water from the composition. If pallet components are molded, they may be cured and subsequently assembled using standard carpenter's tools.

For the food industry, pallets of a tubular construction may be formed using PVC pipes of different diameters. Large diameter PVC pipes are used for the pallet skids and smaller diameter pipes are used for the pallet bed. The aerated cementitious composition of the present invention is pumped under pressure or otherwise forced into each PVC pipe to fill the pipe, and the composition is allowed to harden and cure within the respective PVC pipes. Then the smaller diameter filled pipes are secured to the larger diameter filled pipes using standard tools to form a pallet with a PVC outer coating which can be easily cleaned.

The invention further provides a cementitious composition having novel absorption qualities which are applicable to unique absorption containment functions. The composition, while in the slurry state, has the ability to imbibe contaminants, especially when compressed air is used agitate the mass and create bubbles. The contaminated liquid is assimilated into the mass and is contained thereby when the mass hardens and cures.

In accordance with the present invention, the cementitious composition may be pumped into underground storage tanks to both fill the tank with a strong cement mixture and to absorb and contain contaminants even after the tank deteriorates. As the cementitious mass cures or hardens, the bentonite forms its well documented water-shielding properties preventing the leaching out of the contaminants. This provides a unique and novel method of cleaning up contaminated cylinders or underground tanks.

To contain contaminants, the cementitious composition of the present invention containing sawdust or sawdust and flyash is formed as described, aerated and pumped into the tank or cylinder. Ideally, air is continuously pumped into the slurry within the cylinder or tank until the cementitious composition is thoroughly mixed with petroleum or other contaminants within the cylinder or tank. Then the air is removed and the cementitious composition is permitted to set and cure.

A second method for containing contaminants within a tank or cylinder in accordance with the present invention, particularly where petroleum or other liquid contaminants are involved, is to first apply the dry filler materials for the cementitious composition to the tank with air to agitate the dry filler material. Both dry sawdust or sawdust with flyash, when agitated within the tank by an airstream will absorb liquid contaminants. For example, when N class pozzolan is used in the cementitious composition, it can absorb more than 125% of its own weight in oil. Once the dry filler material has absorbed the liquid contaminants in the tank, the remaining dry ingredients of the cementitious composition (i.e., Portland cement, bentonite, diataomaceous earth, potassium chloride and lime) are added and mixed within the tank or cylinder and then water is added and mixed. The resultant slurry is then aerated by the application of air under pressure and allowed to set. All mixing of materials within the tank or cylinder can be accomplished by the application of a stream of air under pressure.

What is claimed is:

1. A lightweight, electrically nonconductive, waterproof post including a molded, cured cementitious composition comprising:

an elongate, hollow outer shell defining a central, longitudinal chamber, and a cured, cementitious composition filling said central chamber, said cementitious composition consisting essentially of an intermixture formed from a dry mix consisting of the following parts by volume;
  1–6 parts of a noncementitious filler material, said filler material including rubberchips;
  1–4 parts of bentonite,
  1–3 parts of Portland Cement, and
  1–3 parts of diatomaceous earth; and
  consisting of 1–5 parts of water mixed with said dry mix.

2. The lightweight, electrically nonconductive, waterproof post of claim 1 wherein said outer shell is formed by a PVC pipe.

3. The lightweight, electrically nonconductive, waterproof post of claim 2 which includes 1–3 parts rubber chips and 2¼–4 parts sawdust.

4. The lightweight, electrically nonconductive, waterproof post of claim 3 which includes up to 1 part of flyash, 1 part bentonite, 1 part diataomaceous earth, 1 part Portland cement and 3 parts water.

5. The lightweight, electrically nonconductive, waterproof post of claim 1 wherein said filler material includes the following parts by volume:
  2–5 parts of sawdust, and
  3–5 parts of rubber chips.

6. The lightweight, electrically nonconductive, waterproof post of claim 5 wherein said filler material includes ½ to 2 parts calcium oxide and ¼ to 1 part sodium chloride.

7. The lightweight, electrically nonconductive, waterproof post of claim 5 wherein said filler material includes an aggregate mixed with said sawdust and rubber chips, said aggregate being formed by 1 to 3 parts of pozzolan flyash.

8. The lightweight, electrically nonconductive, waterproof post of claim 1 wherein said dry mix includes the following parts by volume:
  5 parts of rubber chips,
  2 parts of Portland cement,
  1 part of diatomaceous earth,
  1 part of bentonite, and
  ½ part of lime.

9. The lightweight, electrically nonconductive waterproof post of claim 1 wherein said water is mixed with said dry mix to form a slurry and air bubbles are formed in said slurry prior to curing.

\* \* \* \* \*